US010812376B2

(12) United States Patent
Leitner (10) Patent No.: US 10,812,376 B2
(45) Date of Patent: Oct. 20, 2020

(54) CHAINING NETWORK FUNCTIONS TO BUILD COMPLEX DATAPATHS

(71) Applicant: Red Hat, Inc., Raleigh, NC (US)

(72) Inventor: Flavio Leitner, Maringa (BR)

(73) Assignee: Red Hat, Inc., Raleigh, NC (US)

( * ) Notice: Subject to any disclaimer, the term of this patent is extended or adjusted under 35 U.S.C. 154(b) by 21 days.

(21) Appl. No.: 15/004,519

(22) Filed: Jan. 22, 2016

(65) Prior Publication Data

US 2017/0214612 A1  Jul. 27, 2017

(51) Int. Cl.
| H04L 12/741 | (2013.01) |
| H04L 12/713 | (2013.01) |
| H04L 12/749 | (2013.01) |
| H04L 12/861 | (2013.01) |
| H04L 12/879 | (2013.01) |
| H04L 29/06 | (2006.01) |

(52) U.S. Cl.
CPC .......... *H04L 45/586* (2013.01); *H04L 45/741* (2013.01); *H04L 49/901* (2013.01); *H04L 49/9036* (2013.01); *H04L 69/22* (2013.01)

(58) Field of Classification Search
None
See application file for complete search history.

(56) References Cited

U.S. PATENT DOCUMENTS

| 8,817,625 B1 | 8/2014 | Zhang et al. |
| 8,971,338 B2 | 3/2015 | Mishra et al. |
| 9,137,161 B2 | 9/2015 | Zhang et al. |
| 2005/0207407 A1* | 9/2005 | Baumberger .......... H04L 49/90 370/389 |
| 2013/0262868 A1* | 10/2013 | Friedman .............. H04L 9/0618 713/171 |
| 2013/0272305 A1 | 10/2013 | Lefebvre et al. |
| 2014/0149981 A1* | 5/2014 | Luxenberg .......... G06F 9/45533 718/1 |

(Continued)

FOREIGN PATENT DOCUMENTS

WO  2015024411 A1  2/2015

OTHER PUBLICATIONS

Mehraghdam et al., "Specifying and Placing Chains of Virtual Network Functions", http://arxiv.org/pdf/1406.1058.pdf, published on Jun. 4, 2014, 7 pages, University of Paderborn, Paderborn, Germany.

(Continued)

*Primary Examiner* — Anh Vu H Ly
*Assistant Examiner* — Hector Reyes
(74) *Attorney, Agent, or Firm* — Womble Bond Dickinson (US) LLP (57) ABSTRACT

A virtual switch executes on a computer system to forward packets to one or more destinations. A method of the disclosure includes receiving, by a processing device executing a virtual network switch, a network packet comprising a header and a payload, identifying, in view of the header, a port of the virtual switch for forwarding the network packet, storing the network packet to a shared memory buffer associated with the port, wherein the shared memory buffer is accessible to a network function, notifying the network function that the network packet is stored to the shared memory buffer; and processing the network packet by the network function.

16 Claims, 4 Drawing Sheets

(56) References Cited

U.S. PATENT DOCUMENTS

| | | | |
|---|---|---|---|
| 2014/0226661 A1* | 8/2014 | Mekkattuparamban | ..................... H04L 49/70 370/392 |
| 2014/0229945 A1 | 8/2014 | Barkai et al. | |
| 2015/0124815 A1 | 5/2015 | Beliveau et al. | |
| 2015/0163150 A1 | 6/2015 | Beheshti-Zavareh et al. | |
| 2016/0380848 A1* | 12/2016 | Raney | ................... H04L 43/028 709/213 |
| 2017/0054659 A1* | 2/2017 | Ergin | ................. H04L 67/1097 |

OTHER PUBLICATIONS

Zimmerman et al., "OpenFlow-enabled SDN and Network Functions Virtualization", https://www.opennetworking.org/images/stories/downloads/sdn-resources/solution-briefs/sb-sdn-nvf-solution.pdf, Open Networking Foundation, published on Feb. 17, 2014, 12 pages.

Baudin, OVS and L7 classification (DPI) use cases and demos—OVS Conference 2015, https://www.youtube.com/watch?v=TzUycajigu8, Published on Nov. 20, 2015, Qosmos, Open vSwitch.

Baudin, OVS and L7 classification (DPI), Demo part 1: L7 Firewall, L7 QoS, Demo part 2: L7 Service Chaining, http://www.openvswitch.org/support/ovscon2015/16/1330-baudin.pptx>, Open vSwitch conference, Nov. 2015, 35 pages, Qosmos.

* cited by examiner

CHAINING NETWORK FUNCTIONS TO BUILD COMPLEX DATAPATHS

TECHNICAL FIELD

Aspects of the present disclosure relate to virtual networks, and more particularly, to performing network functions as part of a network.

BACKGROUND

A computer network may include various computing devices that may communicate with one another through network switches and other network devices. Certain components configured in a network may perform network services.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

A software defined network (SDN) provides abstraction of elements in a network to provide control of the network through a network controller. An SDN separates the data plane of the network from the control plane. For example, the data plane distributes traffic to specific destinations according to a set of rules, whereas the control plane makes decisions to determine the rules defining the distribution of traffic. An SDN may include a network controller that defines the rules for packet handling by switches in the network. A network controller may determine network paths for distribution of data between applications and network destinations. For example, the network controller may determine a set of rules for a switch that instruct the switch where to forward packets received at the switch based on matching the packets to entries in a distribution table. The network controller may be operated at a single network location to provide control of switches throughout the network or may be co-located with a switch to reduce latency in directions from the controller to the switches.

In some SDNs, one or more switches may be implemented as virtual switches. A virtual switch may be implemented as a software module that emulates the physical switch components. Virtual machines and/or other applications may interface with the virtual switch through a plurality of ports of the virtual switch and virtual network interface cards of the virtual machines. The virtual switch may forward communications from a virtual machine to another location on the virtual network such as another virtual machine. The virtual switch may also connect to a physical network interface card to provide access to a physical network for the virtual machines.

Networks may include various hardware and/or software components to provide network services, such as network address translation (NAT), firewalling, intrusion detection, domain name service (DNS), caching, compression, encryption, decompression, decryption, routing, switching, load balancing, denial-of-service protection, packet inspection, policy management and other components that communicate, analyze, or manipulate data on a computer network. Network services may be implemented with specifically designed hardware. For example, a firewall may be implemented as a specially designed network component to perform packet filtering operations. A caching network service may temporarily store packets received at the caching component. A compression network service may reduce the amount of data used to communicate one or more packets, while a decompression network service may restore one or more packets after compression to for use by a destination application. An encryption network service may perform encode information such that only authorized parties can read it, while a decryption network service may convert encrypted data back into its original form. Compression, decompression, encryption, and decryption network functions may modify the payload of the packet. The compression, decompression, encryption, and decryption network functions may also modify the header of packets. A packet inspection network function may read and analyze the contents of a packet including the header and the payload. For example, a packet inspection network function may enable the system to protect against denial-of-service attacks, monitor communications in the packets, perform intrusion detection, or perform other network management services.

Network functions provide software virtualization of network services. For example, a network service may be implemented as a virtual machine emulating the operations of certain hardware components. A network function may be accessed by forwarding a packet from a virtual switch to the virtual machine hosting the network function. For example, a network controller may define rules for a virtual switch to forward packets to a port associated with a specific network function. The network function may modify a packet, return the packet to the virtual switch, drop the packet, or forward the packet to another network function that is chained with the first network function. Modifying a packet may include modifying the header of the packet, modifying the payload of a packet, or encapsulating the packet inside of another protocol to generate a new packet.

Network functions implemented on virtual machines provide the benefits of virtualization by eliminating the need of employing dedicated servers or other hardware components. However, communicating with network functions on virtual machines may result in added delays in processing a packet. For example, a virtual switch may forward a packet to a network function on a virtual machine through a socket connection to a virtual network interface card of the virtual machine. Forwarding the packet from the virtual switch to a network function on a virtual machine may result in several context switches by a host operating system. For example, the virtual switch may operate in the user-space of the host operating system. Forwarding a packet by the virtual switch may invoke a context switch to the kernel space of the host operating system and a second context switch to pass the packet to the virtual network interface card of the virtual machine. After the network function has completed its operations on the packet, the packet may be returned to the virtual switch through the symmetric operations resulting in additional context switches. Such context switches may slow the operation of the computer system and may result in delays in processing packets.

In order to reduce the number of context switching operations, some network functions may be performed by applications running in the user-space of the host operating system and/or within the virtual switch context. However, communication between the virtual switch and the applications performing network functions may still be delayed due to the context switching if such communications are performed through sockets or temporary files.

The present disclosure addresses the above-noted and other deficiencies by introducing a more efficient communication mechanism between the virtual switch and network functions that may be invoked by the network switch for packet processing. In certain implementations, the virtual switch may allocate a shared memory buffer which may be accessible by both the virtual switch and one or more network functions that may be invoked by the virtual switch. The virtual switch and network functions may use the shared memory to pass packets from one to the other without incurring a context switch and thus can reduce the delay that would have been caused in the data path if the context switching were to be performed.

In addition to reducing the context switching operational overhead associated with forwarding a packet from a virtual switch to a virtual machine, executing network functions within the user-space of the host operating system may reduce the overhead generated by running a virtual machine. For example, instantiating and maintaining the emulation of physical components by a virtual machine uses memory and processing resources of a computer. While certain network functions may be executed in a virtual machine to improve overall system performance and operation of the network function within the virtual machine, other network functions may not consume as many system resources and the system may not benefit by dedicating a virtual machine to the network function. For example, some network functions may be hosted on a virtual machine to reduce the amount of server resources permanently dedicated to the network functions, to provide the network functions with emulation of particular hardware used by the network functions, or to provide a particular operating system or features to a network function. Other network functions, however, may consume fewer resources and may execute as an application without dedicated hardware or emulation of hardware. Thus, operating one or more network function as an application in the user-space of a host operating system may reduce the overall load on a computer system created by certain network functions.

For example, a firewall may perform computationally complex packet filtering operations that consume fewer resources when operated on a virtual machine. However, less computationally complex network functions may be performed as applications on the host operating system instead of on a virtual machine. For example, a compression network function may be executed as an application within the host operating system in order to complete compression network services on packets passed through the network.

In order to communicate with network functions operating as applications on the host operating system, the virtual switch and the network functions may execute within the same context of the host operating system. Thus, within the user-space of the host operating system the virtual switch may, instead of forwarding a packet to a network function through a socket, forward the packet to the network function by placing the packet into a shared memory buffer that is accessible by both the virtual switch and the network function. Such a buffer for communications between the virtual switch and the network function may be allocated by a network controller. For example, a network controller may provide directions to a virtual switch to designate a port for communications to a network function. A shared memory buffer may be associated with the designated port, so that the data forwarded through the port is stored to the shared memory buffer, and the associated network function is notified of the incoming packet.

In order to perform more logically complex operations that may integrate several elementary network services, several network functions may be chained together. For example, a network controller may instruct a virtual switch to forward certain packets to a port associated with a chain of network functions. A chain of network functions performs the operations of several network services in the order they are chained. The functions within the chain may be connected to one another, so that network packets would be passed from one network function to the subsequent network function in the chain without the need to return the packet to the switch after completing intermediate operations within the chain. The chained network functions may be executed as applications in the user-space of a host operating system executing the virtual switch so that the virtual switch may forward packets to network functions without incurring a context switch. For example, the virtual switch may store the packet into a shared memory buffer and notify a first network function in the chain of the network functions that a packet has been stored to the shared memory buffer. The first network function may then perform its operations to process the packet and store the packet, in a second shared memory buffer associated with a second network function in the chain. The second network function may then perform its operations. Any number of network functions may be chained together through shared memory buffers allocated to the functions. The final network function in the chain may store the packet back into a shared memory buffer associated with the original port on the virtual switch. Alternatively, the final network function may store the packet as processed in a shared memory buffer associated with a different port of the virtual switch. Chaining multiple network functions together through shared memory reduces the load on the virtual switch that would occur if the network functions operated individually and passed the packet back to the virtual switch after each network function processes the packet.

In addition to performing chains of network functions in the user-space of a host operating system, network functions operating in the user-space may be chained together with network functions executing on virtual machines. For example, a virtual switch may forward a packet to a first network function through a shared memory buffer and the next network function in the packet processing chain may be executed by a virtual machine. Thus, after the first network function returns the packet to the virtual switch, the switch may then forward the packet to a virtual network interface card associated with the virtual machine executing the network function. Any number of network functions operating on virtual machines or in the user-space of the host operating system may be chained together to perform services for the network.

Figure 1:
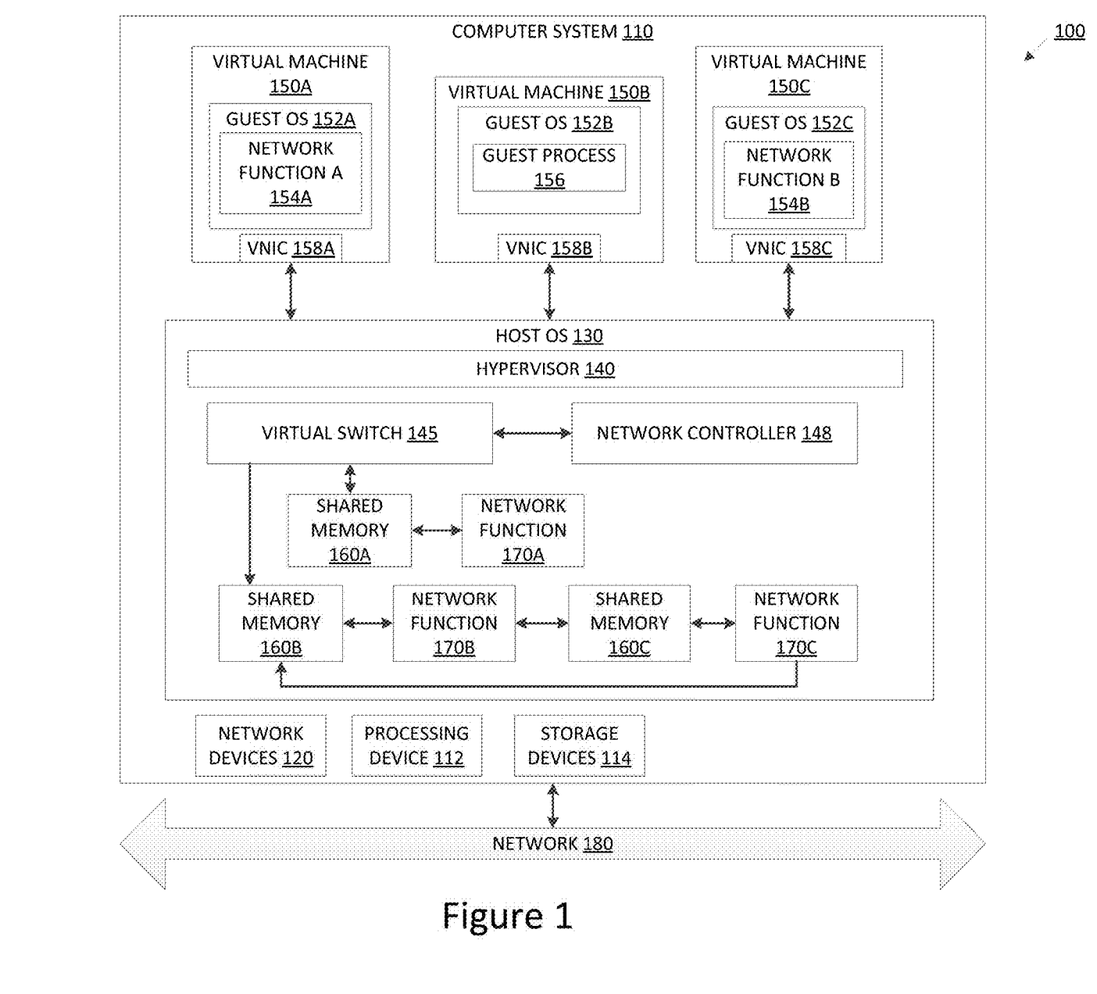
FIG. 1 is a block diagram that illustrates an example of network functions executing on a computer system, in accordance with some aspects of the present disclosure.

FIG. 1 is a block diagram 100 depicting an example of a computing system 110 implementing various network functions invoked through a virtual switch 145. The computing system 110 may include various hardware components including a processing device 112, storage devices 114, input/output device, drivers, network devices 120 (for example, physical switches or other network devices), or the like. The storage devices 114 may be non-volatile memory, such as a hard disk drive, tape drive, flash memory, optical disc drive or the like. The computing system 110 may be a personal computer (PC), server computer, mainframe, handheld device, portable computer, set-top box or any other computing system.

In the example block diagram illustrated in FIG. 1, the host operating system executes one or more applications in its user-space such as a virtual switch 145, network controller 148, and network functions 170, while the kernel-space is reserved for core operations of the operating system. The host operating system 130 may include hypervisor 140 that manages one or more virtual machines 150A-150C operating on the computer system 110. In some implementations, the hypervisor 140 may operate directly on the hardware of the computer system 110 instead of operating on top of a host operating system 130. For example, the functionality of operating system 120 may be extended through the use of a loaded kernel module to perform the functions of a hypervisor. In some implementations, the host operating system 120 may be a Linux operating system extended by a kernel-based virtual machine (KVM) to perform the operations of a hypervisor.

One or more of the virtual machines may be executed as Quick Emulator (QEMU) on the computer system 110. The virtual switch 145 may be Open vSwitch and may be operate in conjunction with an OpenFlow network controller to manage network communications.

The hypervisor 140 may present to other software applications the abstraction of underlying hardware as one or more virtual machines 150A-150C, which execute guest operating systems 152A-152C. The virtual machines 150A-150C use the underlying hardware of the computer system 110 to emulate hardware devices of a computer system. The virtual machines 150A-150C may then appear as physical machines to applications executing on the operating systems of the virtual machines.

Guest operating systems operating on the virtual machines may be the same or different from one another. Virtual machines 150A and 150C execute network functions 154A and 154B on their respective guest operating systems. Network functions 154A and 154B may be invoked by virtual switch 145 by forwarding packets to the virtual network cards 158A and 158C of the virtual machines according to rules set by a network controller 148. For example, the virtual switch 145 may access a distribution, set by a network controller, that determine where to forward packets matching particular patterns. Network functions 154A and 154B may perform operations of different network services. In some examples, network functions 154A and 154B may perform operations of the same network services, but may be implemented on multiple virtual machines due to load on one of the virtual machines 150A and 150C, or multiple virtual machines may be instantiated by network controller 148 to optimize network traffic.

In addition to virtual machines performing network functions, virtual machine 150B executes a guest process 156 on the associated guest operating system. The guest process 156 may consume and generate packets distributed in the network. Although shown as operating a single process or network function on each of the virtual machines, in some implementations, one or more of the virtual machines may execute more processes in their respective guest operating systems. In addition, the computing system 110 may execute fewer virtual machines, for example, zero, one, or two, or the computing system 110 may execute more virtual machines than are shown in FIG. 1.

The virtual machines 150A-150C may communicate with other physical or virtual network locations through virtual network interface cards (vNIC's) 158A-158C. The vNIC may have associated IP and MAC addresses and may communicate with other network devices or locations through the virtual switch 145. The virtual switch may emulate physical hardware of a switch to the virtual machines operating on computer system 110. The virtual switch 145 may forward packets from one virtual machine to other virtual machines and/or physical locations outside of the computer system 110 through network devices 120 that can connect to a network 180. For example, the network device 120 may be a physical network interface card (NIC).

Some of the network functions carried out on virtual machines may perform computationally complex operations using particular operating systems or may generate additional overhead due to the operation of the virtual machine compared to those carried out on the host operating system 130. For example, data passed from the virtual switch 145 to a virtual machine 150A may cause the host operating system to perform several context switches to move the data from the virtual switch 145, into the kernel of the host operating system 130, then into the guest operating system 152A operating on a virtual machine 150A through the vNIC 158A, before reaching the destination network function 154A. After the network function 154A performs its operations, symmetric processes may be used to return the processed packet to the virtual switch 145 before forwarding the packet to a next network location. The context switching incurred by such network functions slows the operation of the data path and processing by the computing system 110. Such context switching may be too slow for communications that are particularly latency sensitive. In order to chain multiple network functions running on multiple virtual machines, a packet may be passed from one to the other through virtual switch 145, which results in multiple communications from the virtual switch 145 to various virtual machines to complete the chain of network functions.

The network functions 170A-170C operating on the hypervisor 140 may communicate with the virtual switch 145 without the resulting context switching from passing data packets to a virtual machine. Network functions 170A-170C operating on the hypervisor 140 may be simpler than those operating on separate virtual machines. For example, the network functions operating on hypervisor 140 may not require virtualization of particular hardware elements for operations, may tie up fewer resources, or may otherwise be suitable for performance as an application on hypervisor 140. The network functions 170A-170C may communicate with the virtual switch 145 through the use of shared memory. A shared memory buffer may include a notification mechanism to complete the communication. Thus, the virtual switch 145 may have a virtual port (not shown) that stores packets into a shared memory buffer. The virtual switch may inspect incoming packets and based on the header of the packet or directions from a network controller may forward packets to one or more designated port as appropriate.

When the virtual switch stores a packet into the shared memory buffer, for example, shared memory 160A in FIG. 1, a network function associated with that shared memory may access the packet and perform a network service. For example, as shown in FIG. 1, network function 170A may access shared memory 160A after receiving a notification that a packet has been placed into the shared memory buffer. After performing its operations, the network function may return the packet to shared memory 160A or another shared memory buffer and notification is provided to the virtual switch 145 that a packet has been returned to the shared memory. In some implementations, the virtual switch and network functions may monitor a shared memory buffer for changes in the data to determine when a packet is stored into the shared memory buffer. For example, a file update indication may be provided in a file header of the shared memory buffer to show that there has been a change in the shared memory data. In some implementations, a virtual switch or a network function may provide notification by modifying a file descriptor associated with the shared memory buffer when performing a write operation. For example, the virtual switch, the network function, or the operating system may modify a file descriptor of the shared memory buffer when a packet is written into the shared memory. The virtual switch and network functions may also monitor the file descriptor for a write by another application running in the user-space of the host operating system to determine when a packet is stored to the shared memory. For example, the virtual switch 145 or a network function 170 may change a value of a file descriptor when a packet is written to the shared memory. For example, a single bit of the file descriptor of the shared memory may be changed from 0 to 1 to indicate that a packet has been stored into the shared memory. In some examples, more than a single bit may be changed to notify other applications that a packet has been provided to the shared memory location. For example, one bit may indicate that a packet has been forwarded to the shared memory buffer by the virtual switch 145 while another bit may indicate that a packet is forwarded to the shared memory buffer by the network function 170. The bits may be reset when a packet is read from the shared memory buffer.

In addition to communicating through shared memory, the virtual switch 145 may communicate packets to network functions operating in the user-space of the hypervisor by passing temporary files, through sockets, pipes, or other communication mechanisms. The communication may be slower than writing to shared memory and result in a context switch, but may still avoid the overhead that would be associated with operating virtual machine-based network functions.

In some implementations, less computationally complex network functions that do not use specialized hardware may operate as applications in the host operating system 130, while more computationally complex network functions that could take advantage of the additional virtual structure may be operated on a virtual machine. For example, network functions performing computationally complex operations such as firewalls, intrusion detection, denial-of-service protection, and the like may be instantiated on a virtual machine to provide adequate processing hardware and individual resources to the network functions. On the other hand, simple network functions such as NAT, compression, encryption, decompression, routing, load balancing, and the like may be performed by applications operating in the user-space of the host operating system 130. In some examples, the computationally complex operations may also be performed as applications in the user-space of the host operating system. Additional custom or application specific network services may also be performed in the user-space of the host operating system.

As shown in FIG. 1, the computing system 110 may execute a chain of multiple network functions to generate more complex operations than would be performed by a single network function. Each network function in the chain of network functions may perform operations on a packet and then pass the packet to the next network function. The network functions may pass the packet between one another without returning the packet to the virtual switch 145 after the completion of each network function. For example, network function 170B and network function 170C are chained together to form a data path that performs the operations of the first network function 170B in the chain of network functions and the operations of the second network function 170C in a chain of network functions. The packet is passed from the virtual switch to network function 170B through a shared memory buffer (shared memory 160B). After processing with network function 170B, the packet is passed to network function 170C through shared memory 160C. After processing the packet with network function 170C, the packet is returned to shared memory 160B and notification is provided to the virtual switch 145 that the packet has returned.

In another example, network function 170C may forward the packet to the virtual switch 145 through a different shared memory buffer at the end of the network function chain. In some implementations, a single shared memory may be utilized by multiple network functions and the virtual switch with a notification mechanism indicating the next network function to access the packet from the shared memory buffer. For example, each network function accessing the shared memory may alter a particular bit in a notification descriptor and the next network function in the chain may monitor for packets stored into the shared memory by the previous network function in the chain. Although FIG. 1 illustrates the use of a single network function and a chain of two network functions, other configurations may include any number of network functions chained together to perform complex operations without the use of forwarding packets to a virtual machine.

The chains of network functions may be set up by a network controller 148. For example, the network controller 148 may instantiate applications to perform the operations of network functions in the user-space of host operating system 130. The network controller 148 may also designate shared memory buffers for use by the virtual switch 145 and network functions. The network controller 148 may setup network functions and chains of network functions at the direction of a network or system administrator. In certain situations, the network controller 148 may request for the computing system 110, the host OS 130, or hypervisor 140 to set up shared memory accessible to the virtual switch 145 and network functions. The network controller 148 may also set up chains of network functions by designating shared memory buffers accessible to each network function in a chain of network functions operating in the user-space of the host operating system 130.

As an example, the virtual switch receiving a Domain Name System (DNS) request on user datagram protocol (UDP) port 53, may forward the packet to a port of the virtual switch. Forwarding the packet to the port of the virtual switch may store the packet in a shared memory that is associated with a network function that inspects the payload of packets. For example, the network function may inspect the packet to determine if the packet is directed to an authorized DNS server. If the DNS server being requested is not on a list of authorized DNS servers, a network function in the chain of network functions may send a notification to a network administrator, modify the request to address an authorized DNS server, or send the modified packet back to the data path by returning it to the shared memory buffer associated with the port of the virtual switch.

As another example, the virtual switch may compare a packet's source or destination address to entries in a distribution table and determine that the header matches a particular subnet. The virtual switch may then direct the packet through one or more network functions that process packets for the particular subnet. For example, the packet may be stored in a shared memory buffer associated with a network function that performs network address translation. Network address translation maps one IP address space to another by modifying the network address information in packet headers. The packet may be address-translated from one address space to another by a first network functions. The network address translation network function may then store the modified packet to a shared memory buffer that is shared with a load balancing network function. For example, a load balancing network function may determine a particular server for distribution of a packet based on usage of available servers. The load balancer may modify the packet header to indicate forwarding to a selected server. After the packet is modified by the load balancing network function, it may returned to the data path of the virtual switch. For example, the network function may store the packet into a shared memory buffer associated with a virtual port of the virtual switch.

The virtual switch 145 may forward packets according to rules defined by a network controller 148. The virtual switch 145 may access the rules in a distribution table that includes entries with various matching criteria. For example, the distribution table may have entries that correspond to particular information in packet headers. Such criteria may include a source Ethernet or IP port, a virtual local area network tag, a destination Ethernet or IP port, or other characteristics of a packet header. If the virtual switch 145 determines that a particular header matches criteria for an entry in the distribution table, then it applies a rule associated with the header. In certain situations, a packet may match multiple rules of the virtual switch 145 and the rules may be performed based on priority of the rules. In certain other situations, a packet may not match any entries in the distribution table and the virtual switch may forward the packet to a network controller to determine how to process the packet. If the network controller 148 determines a port for the virtual switch to forward the packet, the network controller then returns the packet to the virtual switch 145 and directs the packet to a determined port of the virtual switch 145. The virtual switch 145 or network controller 148 may update the distribution table to include an entry for packets having the same header as the packet or a portion of a header the same as the packet. Thus, packets received after the first packet with the same header, or a portion of a header the same as the packet, may be forwarded by the virtual switch 145 in the same manner as the first packet without additional processing by a network controller 148. A network controller 148 may be co-located with virtual switch 145 operated by the computer system 110, or may be operated in a remote location. For example, the network controller 148 may be accessed at another location across network 180. In such cases, the virtual switch 145 operates on the computer system 110 without a local network controller 148. In some implementations, there may be more than one such network controller 148 on a given network.

A network controller 148 may determine that certain packets are to be processed by multiple network functions, or chains of network functions in parallel. For example, the virtual switch may forward a packet to multiple ports of the virtual switch for processing by particular network functions. Referring to FIG. 1, a virtual switch 145 may receive a packet and determine that the packet matches a rule indicating that it is to be processed by multiple network functions, or chains of network functions in parallel. The virtual switch 145 may then forward the packet to a first port associated with a first network function or chain of network functions, and also forward the packet to a second port associated with a second network function or chain of network functions. For example, with reference to FIG. 1, the virtual switch may forward a packet to a first port that corresponds to shared memory 160B and a second port that corresponding to shared memory 160A. The packet may be independently processed by network function 170A and the chain of network functions 170B and 170C. In some implementations, this parallel processing of packets provides additional ability to perform complex network services on a packet. As an alternative to forwarding the packet to multiple ports of the virtual switch 145, the virtual switch may forward the packet to a particular port that includes a shared memory accessible to multiple chains of network functions. For example, a single shared memory may be accessed by network function 170A and network function 170B. The network function chains may then process the packet in parallel. Additional parallel network function chains may be set up by the network controller 148 and the virtual switch 145. For example, a packet may be stored to any number of shared memory buffers associated with ports of the virtual switch 145 for parallel processing by chains of network functions.

Figure 2:
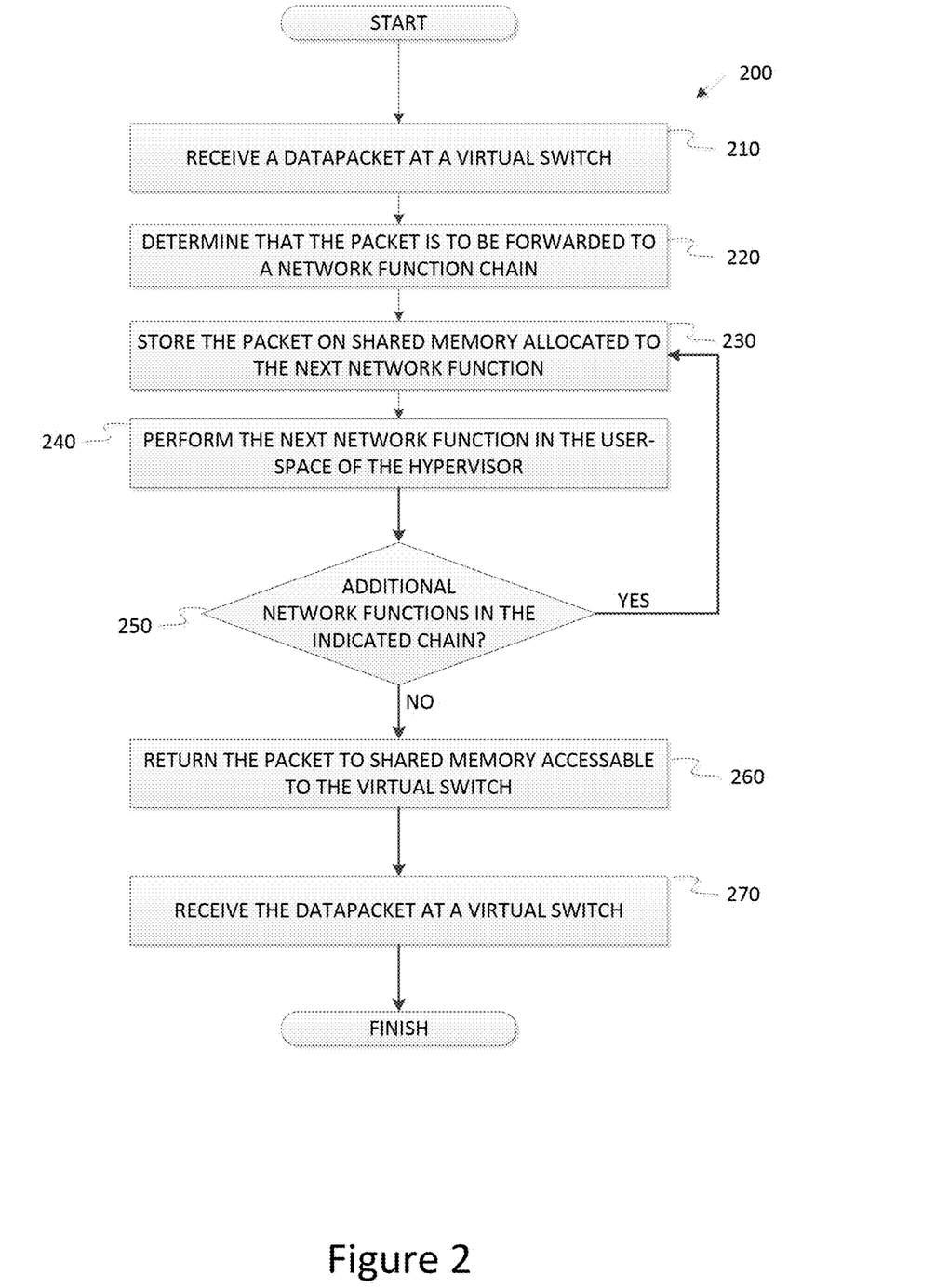
FIG. 2 is a flow diagram that illustrates an example method of distributing packets to network functions, in accordance with some aspects of the present disclosure.

FIG. 2 is a flow chart 200 illustrating a method that may be performed by a computer system implementing a virtual switch. Beginning in block 210, a virtual switch receives a data packet. The data packet may be received from outside a computing system executing the virtual switch or from a virtual machine or other network function operating as part of the computer system. For example, with reference to FIG. 1, the virtual switch 145 may receive the packet from one of virtual machines 150A-150C, may receive the packet from one of network functions 170A-170C, or may receive the packet from network device 120 that received a packet from the network 180.

Moving on to block 220, the virtual switch determines that the packet is to be forwarded to a particular port associated with a network function. The virtual switch may inspect the header information of a packet to determine the appropriate destination to forward the packet. In some implementations, the virtual switch may compare the information in the packet with a forwarding table of configuration file indicating a port to forward the packet. If the virtual switch does not have an entry in its forwarding table for the particular heading information of the packet, the virtual switch may send the packet to a network controller which may determine the appropriate forwarding location for the packet and update the forwarding table of the virtual switch such that the virtual switch will have a match next time a packet with a similar header arrives. The virtual switch may be configured such that packets received from particular sources are forwarded to a port associated with a particular set of network functions. For example, packets received from locations outside of the computing system or a set of trusted locations may be forwarded to a port to be processed with a network function performing firewall operations. As another example, packets with header information indicating that they are to be sent out of the computing system or other local networks may be compressed before forwarding to limit network utilization.

In block 230, the packet may be stored on shared memory allocated to the virtual switch and the particular network function. For example, the port of the virtual switch may be a shared memory space with a notification mechanism. The shared memory space may be accessible by both the virtual switch and the associated network function. Thus, instead of providing the packet to the network function through a socket or other communication channel between the applications, the packet is placed directly into memory accessible to the network function. The shared memory buffer may include a notification mechanism to notify the network function of new packets in the shared memory. For example, reading and writing from the shared memory space may alter a file descriptor associated with the shared memory. The virtual switch and the network function may monitor the notification file descriptor to determine when the other has stored a packet into the shared memory space.

In block 240, the network function executes as an application within the user-space of a computing system. For example, a processing device may execute processes of the network function as an application running in the user-level or user-space of a host operating system. The packet may be modified by the network function, or other operations may be performed by the network function in response to the packet. The network function may also determine a next location to forward the packet. For example, in block 250, the network function determines the next location to forward the packet by determining if there are additional network functions in the chain. If another network function is in the chain of network functions, the packet, as modified, is placed into a shared memory accessible to the next network function. Thus, network functions may be chained together with intervening shared memory spaces for passing packets from one application to another running in the user-space of a host operating system without the added context switching that would occur with other communication methods.

In an example, a network function may determine the location to send the packet to next based on the contents of the packet. For example, an inspection network function may inspect a packet and forward the packet to different locations based on the contents. If the network function determines that the packet is to be processed by a firewall, the packet may be returned to the virtual switch and then passed to a virtual machine that performs firewall functions. On the other hand if the inspection network function does not determine that the packet is to be processed by a firewall, it may be passed along to a next network function in a chain of network functions operating on the user-space of the host operating system. In some implementations, a network function is configured to provide each packet to the same network location after processing. This may reduce the processing performed by the network function in situations where a chain of network functions are performed in the same order.

In block 260, the network function returns that packet to the shared memory buffer after performance of the network function. Storing the packet to the shared memory buffer may also generate a notification to the virtual switch that the network function stored a packet to the shared memory. For example, the network function at the end of a chain of network functions may return the packet to a shared memory buffer accessible to the virtual switch. In another example, if a network function determines that a packet should not be processed by the remaining network functions in a chain, then the network function may return the packet to a shared memory buffer of the port accessible by the virtual switch. In some implementations, the network function at the end of a chain of network functions may place the packet into a different shared memory than the shared memory associated with the original port used by the virtual switch. For example, the last network function in a chain may store the packet in a different shared memory buffer accessible by the virtual switch at another virtual port. As another example, a virtual port that is part of the virtual switch may have more than one associated shared memory buffer, and the last network function in a chain may store the packet in a second shared memory buffer associated with the same virtual port of the virtual switch.

Then in block 270, the virtual switch may receive the packet from the shared memory buffer that is operating as a port of the virtual switch. The virtual switch may then analyze the packet to determine a destination on the network to forward the packet. The packet may be forwarded to another network function or chain of network functions operating in the user-space of the host operating system, to a network function executing on a virtual machine, to a network location outside of the computer system, or to an application or virtual machine to consume the packet. In some implementations, rather than chaining network functions through shared memory the network functions may pass the packet back through the virtual switch to pass the packet from one network function to the next.

Figure 3:
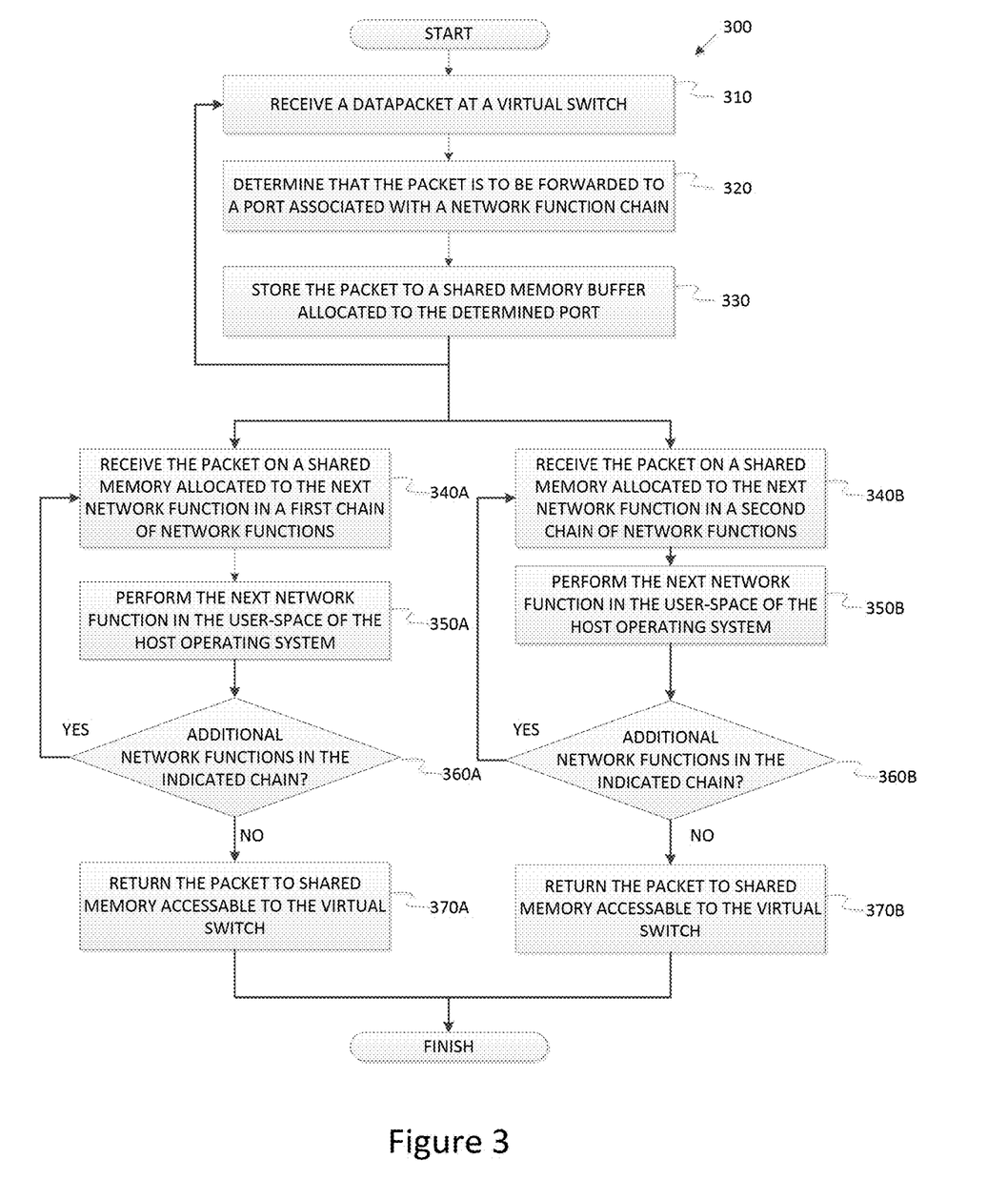
FIG. 3 is a flow diagram that illustrates an example method of distributing packets to network functions, in accordance with some aspects of the present disclosure.

FIG. 3 is a flow chart 300 illustrating a method that may be performed by a computer system implementing a virtual switch. Beginning in block 310, a virtual switch receives a data packet. The data packet may be received from outside a computing system executing the virtual switch or from a virtual machine or other network function operating as part of the computer system.

Moving on to block 320, the virtual switch determines that the packet is to be forwarded to a port of the virtual switch for processing by a network function or chain of network functions. The virtual switch may inspect the header information of the packet to determine if that header matches one or more entries in a distribution table. If the packet matches an entry in a distribution table, an associated rule may indicate to the virtual switch to forward the packet to a particular port associated with a chain of network functions. If the packet does not match an entry in the distribution table, the virtual switch may forward the packet to a network controller to determine how to distribute the packet.

In block 330, the virtual switch forwards the packet to the identified port for processing by a chain of network functions. For example, the virtual switch may store the packet to a shared memory buffer allocated to a port of the virtual switch. The shared memory buffer may be accessible to the first network function in a chain of network functions. In addition to providing the packet to a particular chain of network functions, the virtual switch may continue to forward packets received at the virtual switch. For example, the method of FIG. 3 may return to block 310, and the virtual switch may receive another packet. The method may repeat the processes in blocks 310, 320, and 330 as packets are received at the virtual switch. Additional packets may be forwarded to the same chain of network functions or may be forwarded to a second chain of network functions. For example, the virtual switch may store some packets to a first shared memory buffer associated with a first chain of network functions and store some other packets to a second shared memory buffer associated with a second chain of network functions. In certain situations, the virtual switch may forward a packet to a first chain of network functions and also forward a copy of the packet to a second chain of network functions. The virtual switch may forward some packets to another network destination instead of providing the packets to a chain of network functions. FIG. 3 shows processes in an example method of forwarding packets to two chains of network functions, but in practice any number of chains of network functions may be used. For example, the chains of network functions available to a virtual switch may be limited only by the amount of memory and other resources available to the computing system.

In block 340A, a network function receives a packet at a shared memory buffer allocated to a port associated with a first chain of network functions. The shared memory buffer is accessible to the virtual switch and the first network function in the chain of network functions. The virtual switch may notify the network function of the stored packet by updating a file descriptor monitored by the network function.

In block 350A, the network function executes as an application within the user-space of a computing system. For example, a processing device may execute processes of the network function as an application running in the user-level or user-space of a host operating system. The packet may be modified by the network function or other operations may be performed by the network function in response to the packet. The network function may also determine a next location to forward the packet. For example, in block 360, the network function determines the next location to forward the packet by determining if there are additional network functions in the chain. If another network function is in the chain of network functions, the packet, as modified, is stored in a shared memory buffer accessible to the next network function. Thus, network functions may be chained together with intervening shared memory buffers for passing packets from one network function to the next. Thus, the network function executed in the user-space of a host operating system may communicate without invoking a context switch.

In block 360, if there are no additional network functions, then in block 370A, the last network function in a chain of network functions stores the packet as modified to a shared memory buffer accessible to the virtual switch. In some implementations, the network function at the end of a chain of network functions may place the packet into a different shared memory buffer than the shared memory associated with the original port used by the virtual switch. For example, the last network function in a chain may store the packet in a different shared memory buffer accessible by the virtual switch at a different port of the virtual switch. As another example, a virtual port that is part of the virtual switch may have more than one associated shared memory buffers, and the last network function in a chain may store the packet in a second shared memory buffer associated with the same virtual port of the virtual switch.

In parallel with processes performed in blocks 340A, 350A, 360A, and 370A, the computer system may perform the processes described in blocks 340B, 350B, 360B, and 370B of the flow chart in FIG. 3. For example, a first packet received by the virtual switch may be forwarded to a shared memory allocated to the chain of network functions that performs the operation of blocks 340A, 350A, 360A, and 370A. A second packet received by the virtual switch may be forwarded to a shared memory allocated to the chain of network functions that performs the operations of blocks 340B, 350B, 360B, and 370B. The chains of network functions may be performed in the same manner, but the first chain and second chain of network functions may include a different set of network functions, a different number of network functions, or include some overlapping network functions. Although FIG. 3 shows processing two chains of network functions, the virtual switch may forward a packet to any number of chains of network functions.

The computer system may execute the chains of network functions in parallel as packets are forwarded by the virtual switch. For example, a processing device of the computer system may perform operations of the chains of network functions by splitting the availability of resources to the network functions of each chain. In some implementations, the chains of network functions may be executed on separate processing cores of a multiple core processing device. Thus, the network functions may execute at the same time on a processing device.

Figure 4:
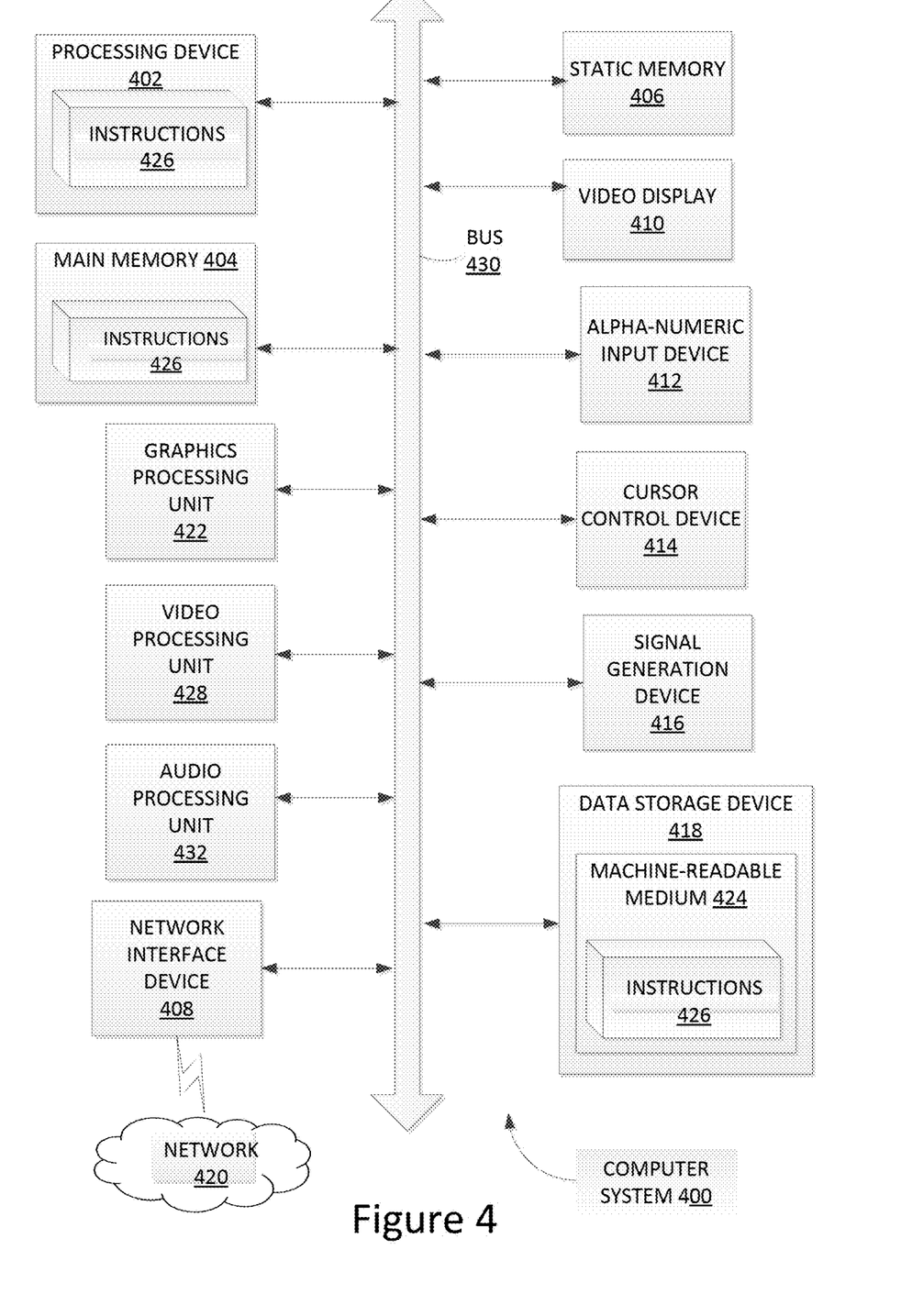
FIG. 4 illustrates an illustrative computer system operating in accordance with one or more aspects of the present disclosure.

FIG. 4 illustrates a diagrammatic representation of a machine in the exemplary form of a computer system 400 within which a set of instructions, for causing the machine to perform any one or more of the methodologies discussed herein, may be executed. The computer system 400 may correspond to the computer system 110 of FIG. 1. In some implementations of the present invention, the machine may be connected (e.g., networked) to other machines (e.g., other computer systems in a network with computer system 110) in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device), which communicate with each other via a bus 408.

The processing device 402 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU (computer processing unit), a multi-core CPU and a massively multi-core system that includes many interconnected integrated circuits, each of which may include multiple processor cores. The processing device 402 may therefore include multiple processors. The processing device 402 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more specialpurpose processing devices such as an application specific integrated circuit (ASIC), a field programmable gate array (FPGA), a digital signal processor (DSP), network processor, system on chip (SoC), or the like. The computer system 400 may include a graphics processing unit 422, a video processing unit 428, and an audio processing unit 432.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 424 on which is stored one or more sets of instructions 426 embodying any one or more of the methodologies or functions described herein (e.g., virtual switch 145, network functions 170A-170C, virtual machines 150A-150C, or the like). The instructions 426 may also reside, completely or at least partially, within the main memory 404 and/or within the processing device 402 during execution thereof by the computer system 400, the main memory 404 and the processing device 402 also constituting machine-readable storage media.

While the computer-readable storage medium 424 is shown in an exemplary implementations to be a single medium, the term "computer-readable storage medium" (or "computer-readable medium") should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies disclosed herein. The term "computer-readable storage medium" shall accordingly be taken to include, but not be limited to, non-transitory media such as solid-state memories, and optical and magnetic media.

The modules, components and other features described herein (for example in relation to FIG. 1) can be implemented as discrete hardware components or integrated in the functionality of hardware components such as ASICS, FPGAs, DSPs, SoCs, or similar devices. In addition, the modules can be implemented as firmware or functional circuitry within hardware devices. Further, the modules can be implemented in any combination of hardware devices and software components, or only in software.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "adding", "receiving", "determining", "routing", "performing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first", "second", "third", "fourth", etc. as used herein are meant as labels to distinguish among different elements and may not necessarily have an ordinal meaning according to their numerical designation.

Implementations of the present invention also relate to an apparatus for performing the operations herein. This apparatus may be specially constructed for the required purposes, or it may comprise a computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various computer systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other implementations will be apparent to those of skill in the art upon reading and understanding the above description. Although the present invention has been described with reference to specific examples, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, by a processing device executing a virtual network switch, a network packet comprising a header and a payload;
   identifying, in view of the header, a port of the virtual network switch for forwarding the network packet;

storing the network packet to a first shared memory buffer associated with the port, wherein the first shared memory buffer is accessible to a network function and the virtual network switch, wherein the virtual network switch and the network function are executed in a user-space of a host operating system, and wherein the virtual network switch is not executed in the kernel-space of the host operating system;

monitoring, by the network function, a file descriptor associated with the first shared memory buffer to determine that the network packet has been written to the first shared memory buffer;

reading, by the network function, the network packet from the first shared memory buffer in response to determining that the network packet has been written to the first shared memory buffer processing the network packet by the network function to generate a modified network packet; and storing the modified network packet to a second shared memory buffer.

2. The method of claim 1, wherein processing the packet by the network function further comprises:

modifying, by the network function, the header of the network packet to produce a modified network packet.

3. The method of claim 2, further comprising:

receiving, by a second network function, a notification of the modified network packet having been stored in the second shared memory buffer;

processing the network packet by the network function.

4. The method of claim 2, further comprising:

receiving, by the virtual switch, a notification of the modified network packet having been stored in the second shared memory buffer;

identifying, a second port of the virtual switch for forwarding the modified network packet; storing the modified network packet to a third shared memory buffer associated with the second port, wherein the third shared memory buffer is accessible to a second network function; and processing the modified network packet by the second network function.

5. The method of claim 1, wherein processing the network packet by the network function comprises performing at least one of: a network address translation operation, a domain name service operation, a caching operation, a compression operation, an encryption operation, a decompression operation, a decryption operation, a load balancing operation, or a packet inspection operation.

6. A system comprising:

a memory comprising a first shared memory buffer and a second shared memory buffer; and a processing device operatively coupled to the memory, the processing device to:

receive, by a virtual network switch executed by the processing device, a network packet comprising a header and a payload;

identify, in view of the header, a port of the virtual network switch for forwarding the network packet;

store the network packet in the first shared memory buffer associated with the port, wherein the shared memory buffer is accessible to a first network function and the virtual network switch, wherein the virtual network switch and the first network function are executed in a user-space of a host operating system, and wherein the virtual network switch is not executed in the kernel-space of the host operating system;

modify, by the first network function, the network packet to produce a modified network packet;

store the modified network packet to a second shared memory buffer, wherein the second shared memory buffer is associated with a second network function;

monitor, by the first network function, a file descriptor associated with the first shared memory buffer to determine that the network packet has been written to the first shared memory buffer; and read, by the first network function, the network packet from the first shared memory buffer in response to determining that the network packet has been written to the first shared memory buffer.

7. The system of claim 6, wherein the processing device is further to:

monitor, by the second network function, a file descriptor associated with the second shared memory buffer to determine that the network packet has been written to the second shared memory buffer; and read, by the second network function, the network packet from the second shared memory buffer in response to determining that data has been written to the second shared memory buffer.

8. The system of claim 7, wherein the processing device is further to:

perform operations of the second network function; and store the packet in the first shared memory buffer.

9. The system of claim 7, wherein the processing device is further to:

perform operations of the second network function; and store the packet in a third shared memory buffer, wherein the third shared memory buffer is accessible to the virtual network switch.

10. The system of claim 6, wherein the processing device is further to execute the second network function in the user-space of the host operating system.

11. The system of claim 6, wherein the processing device is further to:

receive, by the virtual network switch, the second network packet comprising a second header and a second payload;

identify, in view of the second header, a second port of the virtual network switch for forwarding the second network packet; and store the second network packet in a third shared memory buffer associated with the second port, wherein the third shared memory buffer is accessible to a chain of network functions.

12. The system of claim 11, wherein the processing device is further to execute the chain of network functions and the first network function in parallel.

13. The system of claim 6, wherein to determine a port for forwarding the network packet comprises the processing device to:

forward the network packet to a network controller associated with the virtual switch; and receive, from the network controller, directions for forwarding the network packet.

14. A non-transitory machine readable storage medium comprising instructions that, when accessed by a processing device, cause the processing device to:

receive, by a virtual network switch executed by the processing device, a network packet comprising a header and a payload;

identify, in view of the header, a port of the virtual network switch for forwarding the network packet;

store the network packet to a first shared memory buffer associated with the port, wherein the first shared memory buffer is accessible to a first network function and the virtual network switch, wherein the virtual network switch and the first network function are executed in a user-space of a host operating system, and wherein the virtual network switch is not executed in the kernel-space of the host operating system;

monitor, by the first network function, a file descriptor associated with the first shared memory buffer to determine that the network packet has been written to the first shared memory buffer;

read, by the first network function, the network packet from the first shared memory buffer in response to determining that the network packet has been written to the first shared memory buffer;

process the network packet by the first network function; and store the network packet in a second shared memory buffer associated with a second network function in a chain of network functions.

15. The non-transitory machine readable storage medium of claim 14, wherein the instructions further cause the processing device to:

receive, by the first network function, a notification that the network packet is stored into the first shared memory buffer accessible to the first network function and a virtual switch executed by the processing device; and read, by the first network function, the network packet from the first shared memory buffer.

16. The non-transitory machine readable storage medium of claim 14, wherein the instructions further cause the processing device to notify the first network function that the network packet is stored to the first shared memory buffer.

* * * * *